United States Patent Office 3,059,097
Patented Oct. 16, 1962

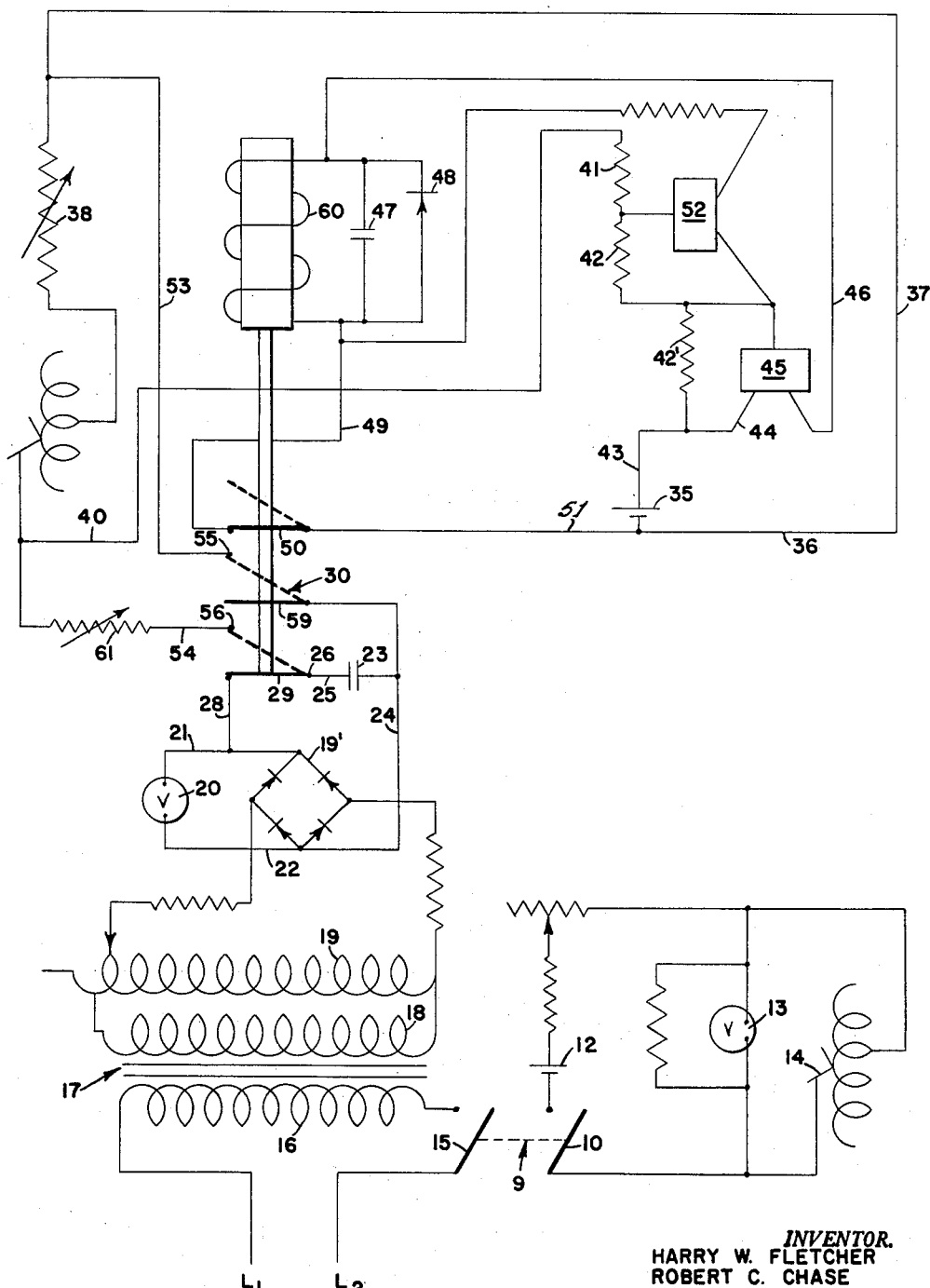

3,059,097
APPARATUS FOR AND METHOD OF WELDING
Harry W. Fletcher, Lynwood, and Robert C. Chase, Whittier, Calif., assignors to Carrier Corporation, Syracuse, N.Y., a corporation of Delaware
Filed Apr. 12, 1960, Ser. No. 21,730
6 Claims. (Cl. 219—108)

This invention relates to apparatus for and a method of welding small metal filaments of the kind employed in equipment for precisely measuring certain electrical phenomena. More particularly, this invention relates to an improved control system for welding equipment utilized in welding small metal filaments or wires.

As indicated above, certain equipment such as precision potentiometers, employed to precisely measure certain electrical phenomena such as the resistance of an electric circuit containing the potentiometer include an electric conducting element having a diameter within the range of .0006" to .015". In conjunction with the conductor there are usually included a plurality of smaller wires connected to the element throughout its extent. The smaller wires are known as tap wires and have a diameter within a range of .0005" to .008". Connecting the tap wires to the conductor element through conventional welding techniques is difficult because of the relatively small size of the wires involved. It has been proposed to utilize a power supply designed to charge a capacitor with a given potential and then discharge the capacitor through a circuit including the wires or metal filaments to be welded by utilizing a glass tube having a small diameter bore and a beveled edge adapted to engage the portion of the conductor element at which point the weld is to be formed. The tap wire, previous to the engagement of the parts is threaded through the bore to the extent that a portion thereof extends beyond the tube and is bent over the outer surface of the tube for engagement against the outer surface by a biased conducting member connected in the circuit with the capacitor. Breakage of the tube as well as a strong tendency for the glass tube to slide along the conducting element and cause the weld to be effected at a different locale on the element than that desired are two disadvantages of this form of resistance welding small metal filaments.

The invention contemplated herein overcomes the disadvantages encountered in the use of the above described attempt to weld the small wires by resistance welding through an arrangement which eliminates the need for the glass tube and which is operative to weld the parts by what may be considered a modification of the resistance welding technique. For its chief object, this invention has the provision of an improved method of and apparatus for welding relatively fine wires of the kind under consideration.

Briefly, the invention contemplates the welding of small wires having a diameter within a range wherein optical magnification is desirable in order to effect the weld in which novel means are provided for controlling discharge of a capacitor electrically connected to the parts to be welded. To this end, it is contemplated that circuitry be provided for controlling the operation of a switching relay supplied for the purpose of transferring the capacitor charging circuit to a second circuit which includes the two metal filaments to be welded. The second circuit referred to above comprises a preliminary or trigger circuit including the two metal filaments, a source of energy limited to a relatively small potential incapable of effecting the weld, the coil controlling the operation of the relay, means for energizing the coil in response to flow of a relatively small current through the metal filaments, and means for protecting the elements of the second circuit that may be subject to damage as the relatively large potential is transferred into the circuit by operation of the switching relay to effect the weld between the two metal filaments.

These and other objects of the invention will be apparent upon a consideration of the ensuing specification and drawings in which:

The FIGURE is a schematic view of a control circuit for welding apparatus equipped with this invention.

As indicated above, the problem of welding relatively small wires together is probably best illustrated in conjunction with the welding of tap wires to resistance elements in precision potentiometers. The resistance element in the potentiometer is formed by helically winding a small wire having a diameter, for example, of .0007" to .015" about the outer surface of a mandrel. Relative movement between the two elements is prevented by applying a bonding compound to the assembled unit. The bonding compound is removed from a portion of the periphery of the element to provide good electric contact between the small wire and a movable electric contactor or conductor adapted to engage the element. In order to weld a tap wire to the resistance element (which itself is formed into a helix or circle with the portion of the element having the bonding compound removed, on the inner periphery and the element inserted in a casing), a portion of a turn of the small wire is scraped free of the bonding compound at a point circumferentially spaced from the locale on the turn adapted for engagement with the movable electric contactor. The tap wire is welded at the point on the turn which is circumferentially spaced from the point of engagement between the movable contactor and the turn.

Equipment capable of alternately supplying a capacitor with a potential of a predetermined magnitude and discharging the capacitor into a circuit including the two wires to be welded is known and used in certain welding operations. This invention contemplates improving this equipment so that resistance welding, or a modification thereof which we prefer to identify as "contact" welding may be conducted without auxiliary equipment such as the glass tube described above.

Referring to the figure for an illustration of the invention it will be appreciated that the figure depicts the invention schematically and that actually the components illustrated are assembled in the manner to be described within a casing and the casing provided with openings permitting the various adjustable elements to regulated. The welding equipment forming the invention is best described in conjunction with a description of the circuits serving to control the equipment.

Basically, it is contemplated that two circuits together with a switching relay be provided. The first circuit which may be referred to as the charging circuit is provided with a source of energy having a relatively large potential and is employed for the purpose of supplying the capacitor with a patential of a given value. The second circuit is provided with a relatively low source of potential and serves to receive the potential of the capacitor for the purpose of effecting the weld. It consists of a number of parts or portions, each of which performs a function directly attributable to the accomplishment of the weld. The second circuit controls the operation of the switching relay only after engagement between the parts to be welded has been accomplished and further is provided with components designed to safeguard certain of its elements upon its being subjected to the relatively large potential of the capacitor.

In utilizing equipment of the kind to which this invention is directed, it is necessary to determine the optimum values of voltage, amperage and resistance for the second circuit to accomplish the weld for each combination of wire or metal filaments to be welded. As indicated above, the welding operation is conducted under circumstances where optical magnification is employed in order to view the wires. Thus the potentiometer to be equipped with tap wires is mounted in a fixture subject to view through a microscope. The optimum values selected for wire sizes involved is predicated in part upon the tap wire being welded directly to the turn of wire upon which the movable contactor rests for the second circuit, or circuit including the two wires, includes the movable contactor merely as a convenience. To assure that the bonding compound is purged from the turn of wire in engagement with the movable contactor, the electrical resistance between the point at which it would appear, from inspection through the microscope, that the compound should be removed and the movable conductor is measured by a probe capable of piercing without scraping the compound. Adjacent turns are tested with the probe until the turn revealing the lowest resistance is encountered. Thus it is this turn that is in engagement with the movable contactor. It will be appreciated that such a procedure is necessary by virtue of the fact that the microscope while sufficient to ensure engagement of the fine tap wire with the resistance wire on the potentiometer will not depict the actual turn in engagement with the movable conductor as the latter is outside the field of the microscope. Thus a separate test circuit forming no part of this invention is shown in the figure and includes an arm 10 of switch 9 controlling the charging circuit. The test circuit includes a battery 12 having a potential of about 1.5 volts. The meter 13 records the resistance detected by probe 14 as it engages the various turns of the resistance element of the potentiometer under consideration.

The first or charging circuit includes an arm 15 of switch 9 serving as a connection between a line voltage of 115 volts A.C. and the primary coil 16 of a transformer 17. The secondary coil 18 of transformer 17 is connected across a voltage regulator 19 employed for the purpose of varying the voltage presented to a bridge rectifier 19' for converting the A.C. supply to D.C. supply. Voltmeter 20 is connected across the bridge by conductors 21 and 22. A capacitor bank 23 is connected by conductor 24 to the bridge output and by conductor 25 to a contact 26 on arm 29 of a triple-pole double-throw switching relay 30. Conductor 28 connects arm 29 to the output of the bridge to complete the charging circuit through the capacitor bank when the relay is in its deenergized position. Thus the capacitor bank is charged with a potential determined to be optimum for the wire sizes involved. It will be appreciated that the optimum values are obtained primarily by trial and error for too large a potential for the circuit resistance will cause disintegration of the wire and too small a potential will be incapable of accomplishing the weld.

The circuits described up to this point are conventional and do not, per se, form a part of the invention. The novel part of the control system, which in turn causes the equipment employing the system to be novel, involves the above-identified second circuit which in general is employed to receive the potential stored in the capacitor bank and feed it through the wires to be welded. However, the second circuit, to be hereindescribed, is effective to automatically actuate the switching relay 30 in response to physical engagement of the wires to be welded. The second circuit, as stated above, is composed of a plurality of parts or sections, each of which is normally connected to an energy source having a relatively low potential on the order, for illustration, of 6 volts.

The second circuit, in addition to its low potential energy source 35, includes connections, through the switching relay, to the charging circuit described. In addition to the primary function of supplying the capacitor charge to the wires to be welded, the second circuit actually controls the operation of the relay by energizing the coil controlling the relay in response to engagement of the wires to be welded. To accomplish this, a first section of the second circuit includes the battery or energy source 35, conductors 36, 37, variable resistance 38, a connection to the movable contactor on the potentiometer to be equipped with the tap wires, the turn on the resistance wire of the potentiometer, the tap wire, a tweezer or other instrument for supporting the relatively fine tap wire, a conductor 40 and a plurality of resistances 41, 42 and 42' and a conductor 43 connected to battery 35. This portion of the second circuit is arranged to permit a flow of a current on the order of .05 milliamp upon energization effected by physical engagement of the tap wire and the resistance wire.

Another branch or section of the second circuit serves to energize the coil 60 regulating operation of the switching relay 30. This section includes conductor 44, transistor 45, conductor 46, relay coil 60, capacitor 47 and rectifier 48, the latter being connected in parallel across conductor 46 and conductor 49. The conductor 49, in turn, is connected to upper arm 50 of the relay 30 when the latter is in its deenergized position. Conductor 51 connects arm 50 of relay 30 to the battery 35 to complete the branch described. In addition to the branch described, a second transistor 52 is connected between the first transistor and the conductor 49. Transistor 52 is provided with its base connection to the line connecting resistances 41 and 42.

Connected across a portion of the second circuit are conductors 53 and 54 employed for the purpose of providing a path of flow for the charge of the capacitor through the wires to be welded by connection to contacts 55 and 56 engaged by arms 29 and 59, respectively, of the relay 30 when the relay is energized by action of coil 60.

Considering the operation of the welding apparatus equipped with the novel control system, once the proper turn on the resistance wire has been established in the manner described above, by closing switch 9 and utilizing the probe 14, the bonding compound is removed at the selected point on the turn and the tap wire is brought into physical engagement with the portion of the turn devoid of bonding compound.

Engagement of the wires to be welded causes a flow of current through the branch of the second circuit which includes conductors 36, 37, resistance 38, the wires to be welded, conductor 40, resistances 41, 42 and 42', and conductor 43. This circuit has a potential of 6 volts and a current flow, based on the resistances employed of about .05 milliamp. Thus disintegration of the wires to be welded through excessive current flow is avoided. However, in order to provide sufficient current to energize the coil 60, amplification of the current is necessary. To accomplish this the use of transistors 45 and 52 are required. By virtue of the connection of its base or output to the portion of the conductor 43 between the resistances 41 and 42, transistor 52 is fed current on the order of .05 milliamp. Through the action of the transistor a greater current issues from the emitter to the fuse of the transistor 45. Once again, current amplification or magnification occurs through the action of transistor 45 so that a current flow of an intensity sufficient to charge capacitor 47 and effect energization of coil 60 issues from the emitter of the transistor 45. The capacity of the resistances 41, 42 and 42' are preferably 33K, 11K and 1.2K, respectively and the transistors 52 and 45 are preferably the grade designated by General Electric Company as 2N44 and the grade designated as 1121 by Clevite Company. Under these circumstances the relatively low current fed to the part of the circuit including the transistors is transformed into a current having a magnitude sufficient to energize coil 60 of relay 30. As pointed out above, this arrangement is necessary for the reason that a current of a magnitude sufficient to energize coil 60 would preheat the wires to be welded causing wire to disintegrate when potential from the capacitor bank 23 is discharged through weld point.

Energization of coil 60 actuates switching relay 30 causing it to move so that the arms 29, 50 and 59 assume the positions indicated in dotted lines in the figure. The movement of arm 50 interrupts the portion of the second circuit through battery 35. Coil 60 remains energized for a limited time due to the presence of capacitor 47 which provides sufficient energy to maintain the coil energized, acting on the order of a holding circuit. The opening of the circuit through the action of arm 50 likewise serves to protect the portion of the circuit subject to the small potential from the effects of the large potential occasioned by the discharge of the capacitor bank 23.

Movement of the arms 29 and 59 of the relay 30 serves to disconnect the capacitor bank 23 from the charging circuit and connect it into that portion or section of the second circuit including the wires to be welded under circumstances where the remainder of the second circuit is isolated. The potential representing the charge on the capacitor is sufficient to effect the weld between the wires. Once the charge of the capacitor 47 has been dissipated, it will be obvious that the coil 60 will be deenergized and the relay will assume the position illustrated in the full line in the figure. Capacitor bank 23 is then disconnected from the circuit containing the wires to be welded and reconnected to the charging circuit where the potential discharged through the weld is replaced.

Thus there is provided a control system for a welding apparatus effective to weld together small wires or metal filaments of the type under consideration wherein the capacitor bank is automatically charged and discharged in a predetermined pattern which eliminates the necessity of manually actuating any circuitry once the individual values of the electrical charge have been determined for the potentiometer and tap wire. The system is effective to discharge the capacitor after physical engagement of the wires to be welded has been accomplished. The novel circuit arrangement enables passage of a relatively small current through the connection formed by the contacting wires and utilizes the existence of the circuit to energize the coil of the switching relay through a current amplification branch of the circuit. Additionally, the control system is effective to isolate those components of the second circuit capable of producing the relatively low current during the time the portion of the circuit including the wires to be welded must be subject to the full charge of the capacitor.

An additional feature of the invention involves interposing variable resistances 38 and 61 in the circuit subject to the discharge of the capacitor. These resistances minimize the effects due to a resistance charge brought about by accomplishing the weld at a point on the turn of the resistance wire a circumferential distance other than that designed to give maximum welding conditions. For example, the optimum values described above depend on a given resistance between the weld and the point on the turn engaged by the movable contactor. Interposing the resistances in the manner described makes less critical the effect of a variance in the positioning of the weld on the turn.

While we have described a preferred embodiment of our invention, it will be understood our invention is not limited thereto since it may be otherwise embodied within the scope of the following claims.

We claim:

1. In apparatus for welding small metal filaments of a size making optical magnification desirable, a first circuit for charging a capacitor to provide a source of potential sufficient to accomplish the weld; a second circuit including the parts to be welded having a relatively low potential insufficient to accomplish the desired weld, energization of said second circuit being effected by contact of the wires to be welded; a relay operative to transfer the potential collected by such capacitor through the portion of the second circuit including the wires to be welded while isolating the remainder of the second circuit; and means operative in response to the flow of current in said second circuit for energizing the coil of said relay.

2. The invention set forth in claim 1 wherein said last mentioned means includes current flow control elements operable to regulate flow of current to the said relay coil.

3. The invention set forth in claim 1 wherein said last mentioned means includes a capacitor arranged in parallel with said coil for the purpose of providing a limited supply of potential to the coil upon deenergization of the circuit containing the relay coil.

4. The invention set forth in claim 1 wherein variable resistance elements are interposed in said second circuit on opposed sides of said metal filaments to minimize the effect of the resistance created by the metal filaments within the circuit.

5. A control system for a welding machine adapted to weld small metal filaments of a size making optical magnification desirable by discharging a capacitor through the filaments comprising a first circuit connecting the capacitor to a source of electrical energy for the purpose of supplying the capacitor with a potential of a predetermined magnitude; a second circuit having an energy source of a relatively low magnitude when compared to the source of energy serving the first circuit, said second circuit including the two metal filaments and arrange so as to be energized upon engagement of the two filaments to provide a path of flow for a current insufficient to accomplish the weld, a switching relay for transferring the capacitor from the first circuit to the second circuit, said second circuit having a part thereof for energizing the coil of a relay, and a part responsive to the flow of current through the metal filament for controlling flow of current to the coil of the relay, the part of said second circuit containing the coil of the relay including a contact of the relay in series therewith and a capacitor in parallel therewith, said capacitor serving to supply a limited amount of potential to the coil upon interruption of the part of the second circuit through the coil by action of the relay, said switching relay being operable upon energization of the relay coil to transfer the energy of the capacitor through the part of the second circuit including the metal filament to accomplish the weld while isolating the parts of the second circuit susceptible to damage by the potential discharged into the second circuit from the capacitor.

6. A method of welding small metal filaments of a size wherein optical magnification is desirable for quantity production by the discharge of a previously charged capacitor, the steps comprising effecting engagement of the parts to be welded to complete a circuit through a low energy source, detecting the current flow through said circuit, amplifying said detected current, feeding said amplified current to a portion of the low energy circuit to energize a relay coil to discharge the capacitor only through the portion of the low energy source circuit that accommodates the wires to be welded while isolating the remainder of the low energy circuit.

References Cited in the file of this patent

UNITED STATES PATENTS

| | | |
|---|---|---|
| 1,933,936 | Schnetzer | Mar. 7, 1933 |
| 2,112,716 | Smith | Mar. 29, 1938 |
| 2,710,328 | Semple | June 7, 1955 |
| 2,894,113 | Wakeley | July 7, 1959 |